(12) United States Patent
Moore et al.

(10) Patent No.: US 11,829,655 B1
(45) Date of Patent: Nov. 28, 2023

(54) METHOD FOR GENERATING DOCUMENT WITH SPECIALTY IMAGING AND COMPUTING DEVICE ASSOCIATED THEREWITH

(71) Applicant: Xerox Corporation, Norwalk, CT (US)

(72) Inventors: Lee C. Moore, Penfield, NY (US); Amanda L. Applin, Pittsford, NY (US); Steven L. Aurand, Fairport, NY (US); Kim P. Ciulla, Bloomfield, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/965,956

(22) Filed: Oct. 14, 2022

(51) Int. Cl.
*G06F 3/12* (2006.01)

(52) U.S. Cl.
CPC .......... *G06F 3/1205* (2013.01); *G06F 3/1267* (2013.01); *G06F 3/1271* (2013.01)

(58) Field of Classification Search
CPC .... G06F 3/1271; G06F 3/1267; G06F 3/1205; G06F 3/1287; G06F 3/1258; G06F 3/1256; G06F 3/1218; H04N 1/2369
See application file for complete search history.

(56) References Cited

U.S. PATENT DOCUMENTS

| | | | |
|---|---|---|---|
| 7,148,999 B2 | 12/2006 | Xu et al. | |
| 7,180,635 B2 | 2/2007 | Wang et al. | |
| 8,892,995 B2 | 11/2014 | Hoppenot et al. | |
| 9,712,698 B1* | 7/2017 | Gopalakrishnan | G06K 15/1801 |
| 11,106,398 B2 | 8/2021 | Nazzaro et al. | |
| 2003/0231349 A1 | 12/2003 | Wang et al. | |
| 2004/0000786 A1 | 1/2004 | Xu et al. | |
| 2011/0191670 A1 | 8/2011 | Hoppenot et al. | |
| 2013/0128317 A1* | 5/2013 | Chapman | H04N 1/54 358/2.1 |
| 2013/0271791 A1* | 10/2013 | Miyazaki | G06F 3/1285 358/2.1 |

(Continued)

OTHER PUBLICATIONS

Fraud-Resistant Effects That Protect Your Most Sensitive Documents, Xerox Brochure PN03313 FFSBR-47UCBR25860, Copyright 2019 Xerox Corporation.

(Continued)

*Primary Examiner* — John R Wallace
(74) *Attorney, Agent, or Firm* — Lippes Mathias LLP

(57) ABSTRACT

A method for generating a document with specialty imaging includes: receiving a document with three pages, including a content page, a mask page with a background color and a foreground color, and an effect page with special imaging effect(s); processing the mask and effect pages by hiding a portion of the effect page overlapped by the background color to form a transformed effect page with a remaining portion, wherein the foreground color at least partially unhides the remaining portion such that the transformed effect page includes at least one specialty imaging effect; and processing the transformed effect and content pages by overlaying the transformed effect page on the content page to generate a transformed content page that forms a transformed document with specialty imaging. A computing device for implementing the method is also provided. A non-transitory computer-readable medium associated with the method is provided.

20 Claims, 6 Drawing Sheets

(56) References Cited

U.S. PATENT DOCUMENTS

2018/0035006 A1* 2/2018 Bermundo ............ G06F 3/1256
2021/0191665 A1 6/2021 Nazzaro et al.

OTHER PUBLICATIONS

Xerox® FreeFlow® Variable Information Suite, Xerox Brochure TSK-483 BR32117 FFSBR-05UF, Sep. 2020, Copyright 2020 Xerox Corporation.
Job Preparation, Simplified. Your Capabilities, Amplified., Xerox Brochure TSK-2842 BR34704 FFSBR-06UD, Feb. 2022, Copyright 2022 Xerox Corporation.

* cited by examiner

METHOD FOR GENERATING DOCUMENT WITH SPECIALTY IMAGING AND COMPUTING DEVICE ASSOCIATED THEREWITH

BACKGROUND

This disclosure presents various embodiments of a method for generating a document with specialty imaging. The various embodiments process three pages (e.g., content page, mask page, and effect page) of an input document to generate a transformed content page that forms a transformed document with specialty imaging. The disclosure also presents various embodiments of a computing device for implementing the method and a computer-readable medium storing program instructions associated with the method. In one application, the input document is received from an application program via a print stream. In another application, the input document is received from a communication stream. In yet another application, the input document is received as a stack of printed pages by a scanning device associated with the computing device. Other applications are also envisioned in which multiple pages of an input document are merged to generate transformed pages that form a transformed document in any type of overlay/underlay arrangement.

Specialty imaging technology that creates effects on printed documents has been developed. Examples of specialty imaging effects include GlossMark® printing (GM) in which text or an image is printed in a way that the content is not visible in straight-on view, but becomes visible as gloss under inclined illumination, infrared (IR) marking for marks, which are only visible with an IR camera under illumination with IR light, ultraviolet (UV) marks, which are visible when illuminated with UV light, and correlation marks (CO), which are visible with specific transparency grids. Microtext marks and fluorescent marks are also examples of Xerox® specialty imaging effects. These techniques rely on software and are available as add-ons for workflow management products and the like. Some of these products are dedicated to text elements with the usage of specific fonts or patterns, and some other products to graphic elements with a dedicated user interface. GlossMark® and Xerox® are registered trademarks of Xerox Corporation.

The ability to create these specialty imaging effects has been limited to specialized, professional, production tools, such as Xerox® FreeFlow® VI Design Express and Xerox® FreeFlow® VI Design Pro. The common office user does not have each access to such tools. FreeFlow® is a registered trademark of Xerox Corporation.

INCORPORATION BY REFERENCE

The following references, the disclosures of which are incorporated herein in their entireties by reference, are mentioned:

U.S. Pat. No. 7,148,999 to Xu et al., Variable Glossmark, issued Dec. 12, 2006.

U.S. Pat. No. 7,180,635 to Wang et al., Halftone Image Gloss Control for Glossmarks, issued Feb. 20, 2007.

U.S. Pat. No. 8,892,995 to Hoppenot et al., Method and System for Specialty Imaging Effect Generation Using Multiple Layers in Documents, issued Nov. 18, 2014.

U.S. Pat. No. 11,106,398 to Nazzaro et al., Added Output Functions for Saved Jobs on Multi-Function Devices, issued Aug. 31, 2021.

Fraud-Resistant Effects That Protect Your Most Sensitive Documents, Xerox Brochure PN03313 FFSBR-47UCBR25860, Copyright 2019 Xerox Corporation.

Xerox® FreeFlow® Variable Information Suite, Xerox Brochure TSK-483 BR32117 FFSBR-05UF, September 2020, Copyright 2020 Xerox Corporation.

Job Preparation, Simplified. Your Capabilities, Amplified., Xerox Brochure TSK-2842 BR34704 FFSBR-06UD, February 2022, Copyright 2022 Xerox Corporation.

BRIEF DESCRIPTION

In one aspect, a computer-implemented method for generating a document with specialty imaging is provided. In one embodiment, the method includes: receiving a document at a computing device, wherein the computing device includes at least one processor and associated memory and a storage device, wherein the document includes at least three pages, including i) a content page, ii) a mask page with a background color and at least one foreground color, and iii) an effect page with at least one special imaging effect; at least temporarily storing the content page, mask page, and effect page in the storage device; processing the mask page and the effect page using the at least one processor and associated memory by hiding a first portion of the effect page overlapped by the background color of the mask page to form a transformed effect page with a remaining portion of the effect page, wherein the at least one foreground color of the mask page is configured to at least partially unhide the remaining portion of the effect page such that the transformed effect page includes one or more specialty imaging effects; at least temporarily storing the transformed effect page in the storage device; processing the transformed effect page and the content page using the at least one processor and associated memory by overlaying the transformed effect page on the content page to generate a transformed content page that forms a transformed document with specialty imaging; and at least temporarily storing the transformed document in the storage device.

In another aspect, a computing device for generating a document with specialty imaging is provided. In one embodiment, the computing device includes at least one processor and associated memory; and a storage device in operative communication with the at least one processor. The at least one processor is configured to receive a document that includes at least three pages, including i) a content page, ii) a mask page with a background color and at least one foreground color, and iii) an effect page with at least one special imaging effect. The at least one processor and associated memory are configured to at least temporarily store the content page, mask page, and effect page in the storage device. The at least one processor and associated memory are configured to process the mask page and the effect page by hiding a first portion of the effect page overlapped by the background color of the mask page to form a transformed effect page with a remaining portion of the effect page, wherein the at least one foreground color of the mask page is configured to at least partially unhide the remaining portion of the effect page such that the transformed effect page includes one or more specialty imaging effects. The at least one processor and associated memory are configured to at least temporarily store the transformed effect page in the storage device. The at least one processor and associated memory are configured to process the transformed effect page and the content page by overlaying the transformed effect page on the content page to generate a transformed content page that forms a transformed document with specialty imaging. The at least one processor and associated memory are configured to at least temporarily store the transformed document in the storage device.

In yet another aspect, a non-transitory computer-readable medium is provided. The non-transitory computer-readable medium storing program instructions that, when executed by at least one processor, cause a computing device to perform a method for generating a document with specialty imaging. In one embodiment, the method includes: receiving a document at the computing device, wherein the document includes at least three pages, including i) a content page, ii) a mask page with a background color and at least one foreground color, and iii) an effect page with at least one special imaging effect; at least temporarily storing the content page, mask page, and effect page in a storage device accessible to the computing device; processing the mask page and the effect page by hiding a first portion of the effect page overlapped by the background color of the mask page to form a transformed effect page with a remaining portion of the effect page, wherein the at least one foreground color of the mask page is configured to at least partially unhide the remaining portion of the effect page such that the transformed effect page includes one or more specialty imaging effects; at least temporarily storing the transformed effect page in the storage device; processing the transformed effect page and the content page by overlaying the transformed effect page on the content page to generate a transformed content page that forms a transformed document with specialty imaging; and at least temporarily storing the transformed document in the storage device.

DETAILED DESCRIPTION

Figure 1:
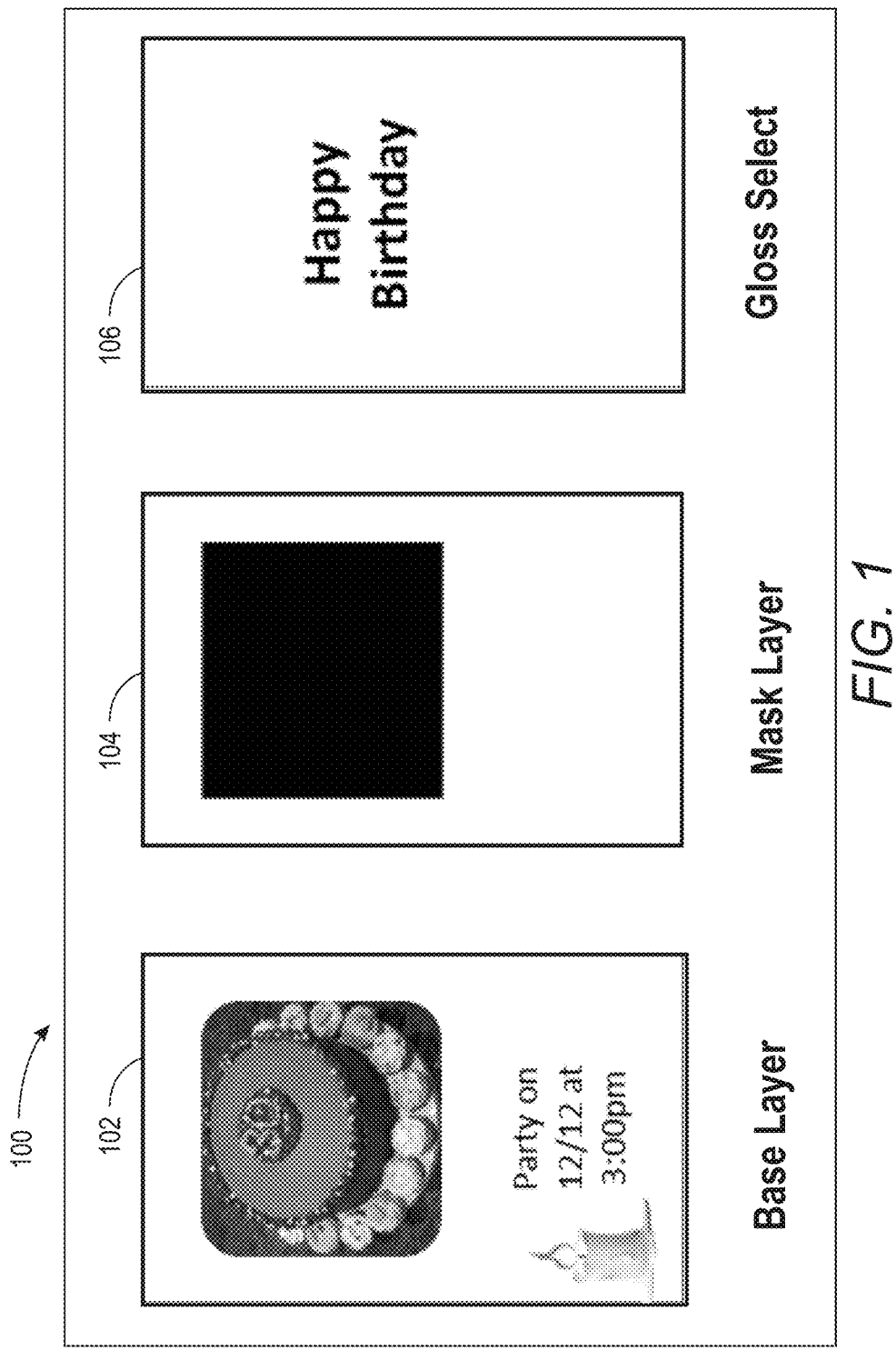
FIG. 1 shows an exemplary embodiment of a three-page document for input to various processes and computing devices disclosed herein.

Aspects of the present exemplary embodiment relate to a method for generating a document with specialty imaging and a computing device for implementing the method. The exemplary method and computing device receive as input a document with at least three pages. The three pages include: i) a content page, ii) a mask page with a background color and at least one foreground color, and iii) an effect page with at least one specialty imaging effect. The document may be received from any software application that produces, manipulates, or renders multi-page documents. Alternatively, the document may be assembled from printed pages created by any suitable means. The content, mask, and effect pages of the document are processed to generate a document with specialty imaging that is, for example, ready for printing on a specialty imaging effect printer.

In one embodiment, the method and computing device provide a "document UI" approach where the imaging effects can be created by a user submitting multiple pages to produce one output page. For example, the user can place three pages in a duplex automatic document handler (DADH) of a multifunction document processing system, selects a specialty imaging merge of the pages, and a new job is created. In this workflow, the first page is taken as a "base page" that contains desired subject matter and the second page is taken as a "mask page," while the third page is taken as an "effect page" that contains specialty effects content. The content on the third page is "pushed" through the mask and is used to create the specialty effects to be added to the "base page." For example, in the case of a GlossMark® effect, black areas of the mask page selects where the GlossMark® effect will occur in relation to the desired subject matter of the "base page" and the "effect page" contains at least one gloss image that aligns with the black areas. In another embodiment, a print job with the same three pages is received by the multifunction document processing system for processing by the same techniques. The same approach can be used for fluorescent mark and infrared mark effects.

An advantage of this approach is to give office users access to some of the power of specialty imaging without specialized, professional, document production tools. Additionally, the ability to provide specialty imaging need no longer be image centric, but rather can be page and/or document centric, meaning that the same complete effect can be applied on several images or text elements on the same page, on consecutive pages, or on all pages of the document.

The exemplary methods and computing device presented herein may be used to create specialty imaging text and other graphical element effects at the same time. With respect to specialty imaging text, the exemplary embodiments do not need to use or create a specialty imaging font to implement the specialty imaging text.

As used herein, a "graphical element" includes any element on a document that is capable of being printed and includes, but is not limited to, text and images, wherein images include vector and raster-based graphics. For example, graphical elements may include text in any font; raster images, icons, or images in any format such as JPEG, portable network graphics (PNG), graphics interchange format (GIF), bitmap (BMP), etc.; vector graphics in any format such as scalable vector graphics (SVG) and vector markup language (VML).

One aspect of the present exemplary embodiment, for example, converts a three-page document input in a suitable format, such as PDF or XPS file(s), into a Specialty Imaging (SI) file which may be a print ready file. When the SI file is rendered, a printed document which contains special print effects is generated. For example, the SI file may contain images that are only visible under a special light or camera or under a specific angle of illumination. The graphical information describing how to apply such effects is drawn from the "effect page" of the three-page document before the SI file is created.

Another aspect of the exemplary embodiment allows office users to generate documents with specialty imaging effects, independently of the software application they use to create the "base page" of the three-page document. Office users can extend their creativity without changing their habits. This can avoid the learning curve common to the use of many current specialty imaging creation software.

Another advantage of the exemplary method and system is the multiplicity of effects that the office user may implement with these specialty imaging techniques. Specialty imaging effects can be applied on both text and images. A single imaging effect may be applied simultaneously on a set of text and images.

Another aspect of the exemplary embodiment gives the office user the opportunity to create specialty imaging effects without any content type limitations (text, graphics, or images) with his preferred software application.

To be able to transform a three-page document into a print ready file containing specialty imaging effects, in one aspect, the exemplary method analyzes the entire input document, converts all concerned graphical elements using a processor suitable for processing specialty imaging effects and optimizes the resulting document with specialty imaging.

For example, specialty imaging effects can have a specific identifier, e.g., a prefix or suffix that defines the intended effect. The identifiers may include, for example, "GM" for gloss mark, "CO" for correlation marks, "IR" for infrared marks, and "UV" for ultraviolet marks, or other alphanumeric identifiers. In general, a specialty imaging effect layer serves to modify an associated portion of a "base page" (also referred to as a "content page").

A gloss mark effect layer contains graphical elements that, when processed by the exemplary embodiments and printed on a specialty imaging printer, are not visible in straight-on view, but become visible as gloss under inclined illumination.

A correlation mark effect layer contains graphical elements that, when processed by the exemplary embodiments and printed on a specialty imaging printer, are not visible unless the printed document is superimposed by a "key" transparency.

Some effect layers, such as ultraviolet mark and infrared mark, contain graphical elements that, when processed by the exemplary embodiments and printed on a specialty imaging printer, are detectable, visually, or otherwise, only under electromagnetic radiation of a specific wavelength or wavelength range which is outside of the visible light region of the spectrum. For instance, ultraviolet mark and infrared mark effect layers are printed with a chemical that fluoresces or otherwise makes the effect detectable under ultraviolet and infrared radiation, respectively.

The "effect page" used herein is not limited to the specialty imaging effects listed above. Any specialty imaging effect that is manageable via overlay on "content pages" and capable of being rendered by a specialty imaging printer may be associated with an "effect page."

The output of the exemplary embodiments is a transformed document, e.g., a print ready file. The file may be any printable file, including for example, a PDF or Postscript file, where effect layers have been applied to graphical elements contained in the visual layer(s). In this way, a device capable of printing the specialty imaging effects can directly produce the expected specialty imaging marks that were defined by the effect layers.

For example, for creating different halftones of the background image according to the effect layer image for a gloss mark effect, any black region enforces a first anisotropic halftone for the corresponding pixels of the background image and any white region of the effect layer enforces a second anisotropic halftone for the corresponding pixels of the background image. (See, for example, U.S. Pat. No. 7,148,999, incorporated herein by reference, for further details on gloss marking). For a correlation mark effect, halftones for the background image are selected according to the effect layer image for creating the correlation mark effect. Specifically, black regions of the effect layer enforce "grid readable" halftones for corresponding pixels of the background image in the visual layer and white regions of the effect layer enforce regular halftones for the corresponding pixels of the background image in the visual layer. For UV and IR effect layers, this slightly changes a color of corresponding pixel of the background image according to the effect layer image. Specifically, black pixels of the effect layer enforce a corresponding UV or IR color for corresponding background image pixels (changes which are only visible under UV or IR light), while white pixels of the effect layer maintain the same corresponding background pixel.

As will be appreciated in the foregoing, the effect images are described as having "black" and "white" pixels. These merely represent the two states of the effect layer pixels and are not intended to represent black and white colors. In a gloss mark image, there may be more than two states. For example, three or more different halftones may be used.

The certain exemplary methods disclosed herein may be run fully automatically, without user input as a document flow process and does not require a user interface. However, a user interface such as a graphical user interface (GUI) may be utilized in an alternative embodiment. In one embodiment, the method and computing device waits for a new input document file at a specific "hot folder" to start the specialty imaging transformation. The hot folder may reside locally or across a network. The output file created by the method and computing device is delivered to a specific output folder which is defined by a system administrator using configuration files. The ability to run the exemplary method as a batch process allows for a flexible printing request architecture.

For example, an SI converter may be on the office user's computer, on a print server, on the printer itself, or where the RIP is located (on the print server or on the device). The exemplary method may be implemented on any computer independently of the operating system.

The print server installation also has advantages in the domain of personalized variable data documents. A variable data set may contain one or more of a visual graphical element, effect shape, effect type or no effect at all. Some solutions allow a user to merge graphical designs with variable data stored in a database. A transformed document file can be generated for each record in the variable data set. Each resulting transformed document file can be converted into a specialty imaging print ready file. Another advantage of the server-based solution is that the CPU processing is done on the server or printer for the conversion and not on the user's computer.

With reference to FIG. 1, an exemplary embodiment of a three-page document 100 is shown. This three-page document 100 is configured for input to the various embodiments of methods and computing devices for generating a document with specialty imaging disclosed herein. As shown, the three-page document 100 includes a "base layer" page 102, a "mask layer" page 104, and a "gloss select" page 106. The "base layer" page 102 is also referred to as a base page and a content page in this disclosure. The "mask layer" page 104 is also referred to as a mask and a mask page in this disclosure. The "gloss select" page 106 is also referred to as an effect page in this disclosure. Using the multipage document technique disclosed herein is an alternative to generating a document with specialty imaging from a layered document.

Figure 2:
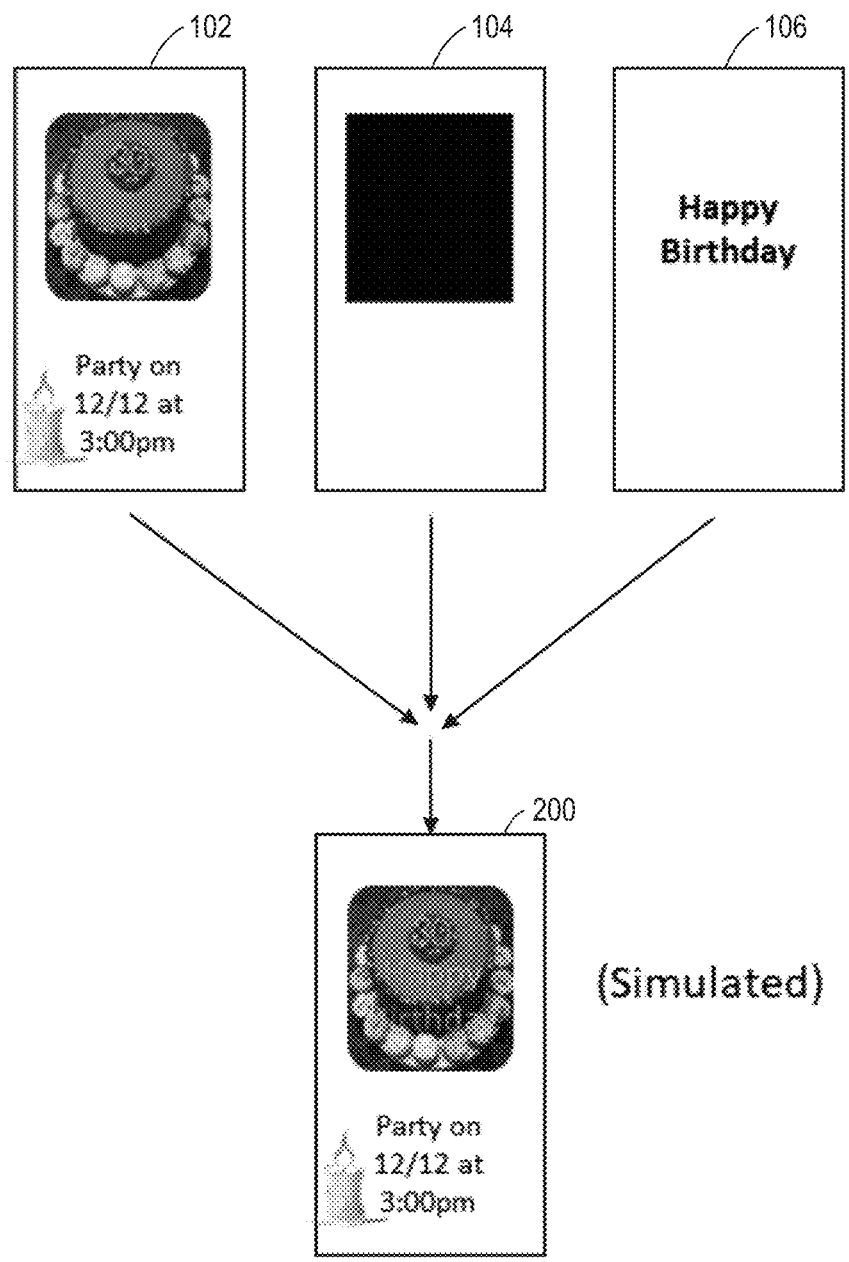
FIG. 2 shows an exemplary embodiment of a transformed document generated from the three-page document of FIG. 1 using the various processes and computing devices disclosed herein.

With reference to FIG. 2, an exemplary embodiment of a transformed document 200 is shown based on the three-page document 100 of FIG. 1. Various embodiments of a method for generating the transformed document 200 based on a multipage document are disclosed herein. Generally, a "Happy Birthday" gloss mark on the "gloss select" page 106 passes through the black portion of the "mask layer" page 104. Then, the "Happy Birthday" gloss mark is overlaid on the "base layer" page 102. The transformed document 200 is shown with the "Happy Birthday" gloss mark over the cake image portion of the "base layer" page 102. In the drawing, the "simulated" annotation associated with the transformed document 200 is added to indicate that the "Happy Birthday" gloss mark is represented in the drawing but not normally visible from a straight-on view. Normally, the "Happy Birthday" gloss mark only becomes visible at an angular view of the transformed document 200.

Figure 3:
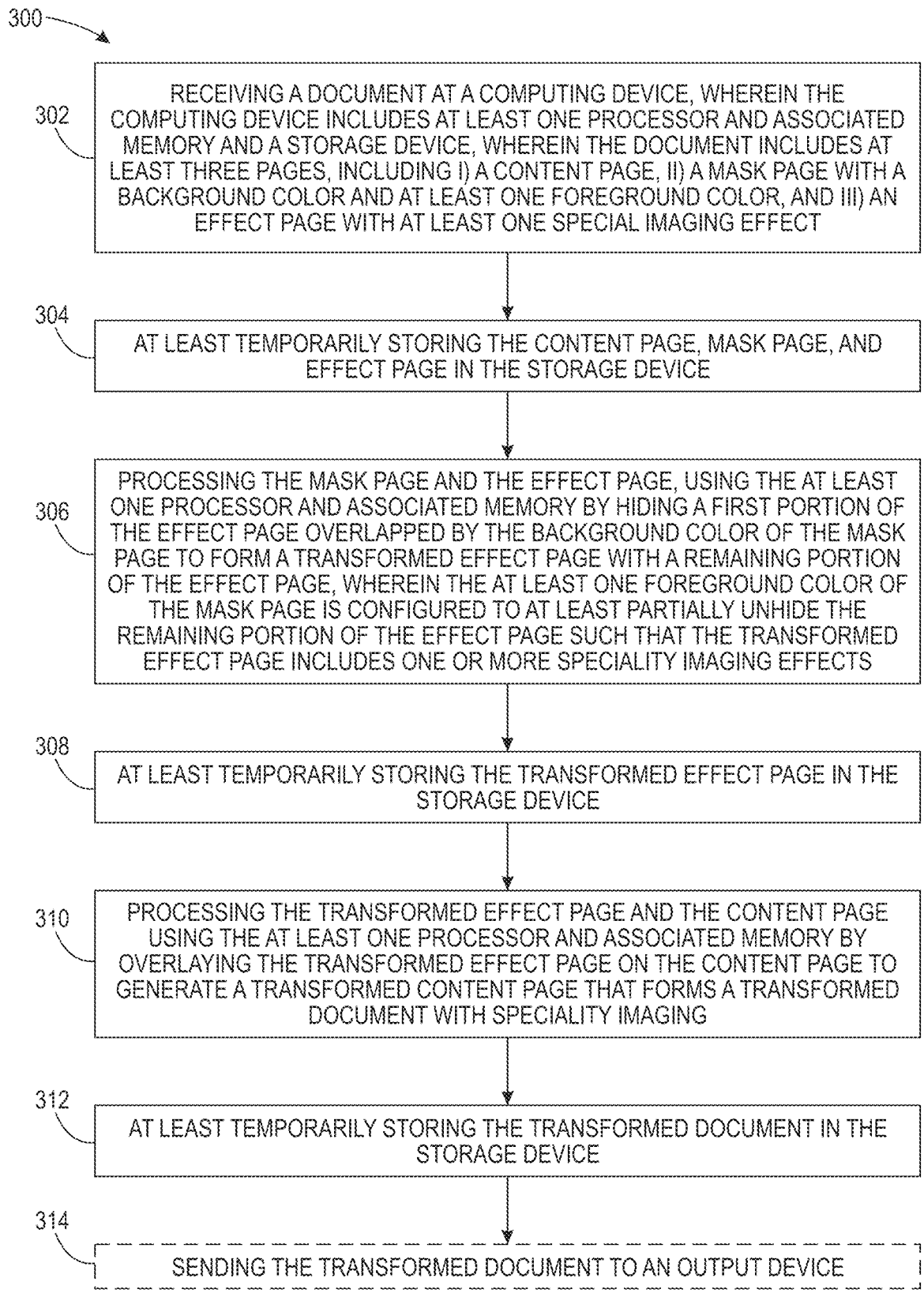
FIG. 3 is a flowchart of an exemplary embodiment of a process for generating a document with specialty imaging.

With reference to FIG. 3, an exemplary embodiment of a process 300 for generating a document with specialty imaging begins at 302 where a document is received at a computing device. The computing device includes at least one processor and associated memory and a storage device. The document includes at least three pages. For example, a set of three pages includes: i) a content page, ii) a mask page with a background color and at least one foreground color, and iii) an effect page with at least one special imaging effect. Next, the content page, mask page, and effect page are at least temporarily stored in the storage device (304).

At 306, the mask page and the effect page are processed using the at least one processor and associated memory by hiding a first portion of the effect page overlapped by the background color of the mask page to form a transformed effect page with a remaining portion of the effect page. The at least one foreground color of the mask page is configured to at least partially unhide the remaining portion of the effect page such that the transformed effect page includes one or more specialty imaging effects. Next, the transformed effect page is at least temporarily stored in the storage device (308).

At 310, the transformed effect page and the content page are processed using the at least one processor and associated memory by overlaying the transformed effect page on the content page to generate a transformed content page that forms a transformed document with specialty imaging. Next, the transformed document is at least temporarily stored in the storage device (312).

With continued reference to FIG. 3, another embodiment of the process 300 continues from 312 to 314 where the transformed document is sent to an output device. In a further embodiment of the process 300, the output device includes a rendering device, a printing device, a display device, a server device, a print server, a document retention device, a cloud device, or any suitable output device in any suitable combination.

In yet another embodiment of the process 300, the document is an electronic document received in a print stream from an application program. In still another embodiment of the process 300, the document is an electronic document received in a communication stream via an input device. In still yet another embodiment of the process 300, the document is a printed document received in a communication stream via a scanning device. In another embodiment of the process 300, the at least one special imaging effect includes a gloss mark, an infrared mark, a correlation mark, an ultraviolet mark, a microtext mark, a fluorescent mark, or any suitable specialty imaging effect in any suitable combination.

Figure 4:
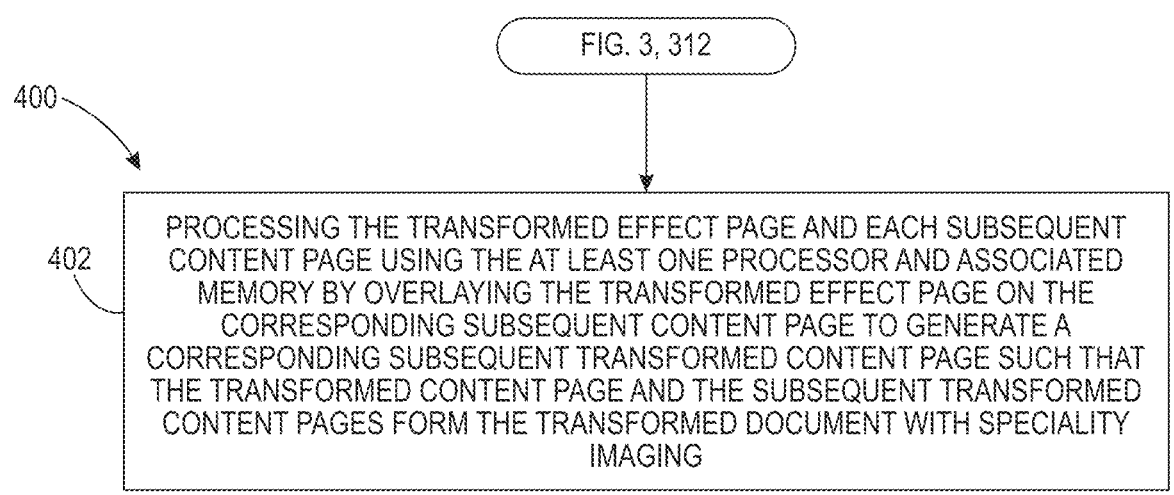
FIG. 4, in combination with FIG. 3, is a flowchart of another exemplary embodiment of a process for generating a document with specialty imaging.

With reference to FIGS. 3 and 4, an exemplary embodiment of another process 400 for generating a document with specialty imaging includes the process 300 of FIG. 3. In this embodiment, the document includes multiple content pages. The process 400 continues from 312 to 402 where the transformed effect page and each subsequent content page are processed using the at least one processor and associated memory by overlaying the transformed effect page on the corresponding subsequent content page to generate a corresponding subsequent transformed content page. The transformed content page and the subsequent transformed content pages form the transformed document with specialty imaging.

Figure 5:
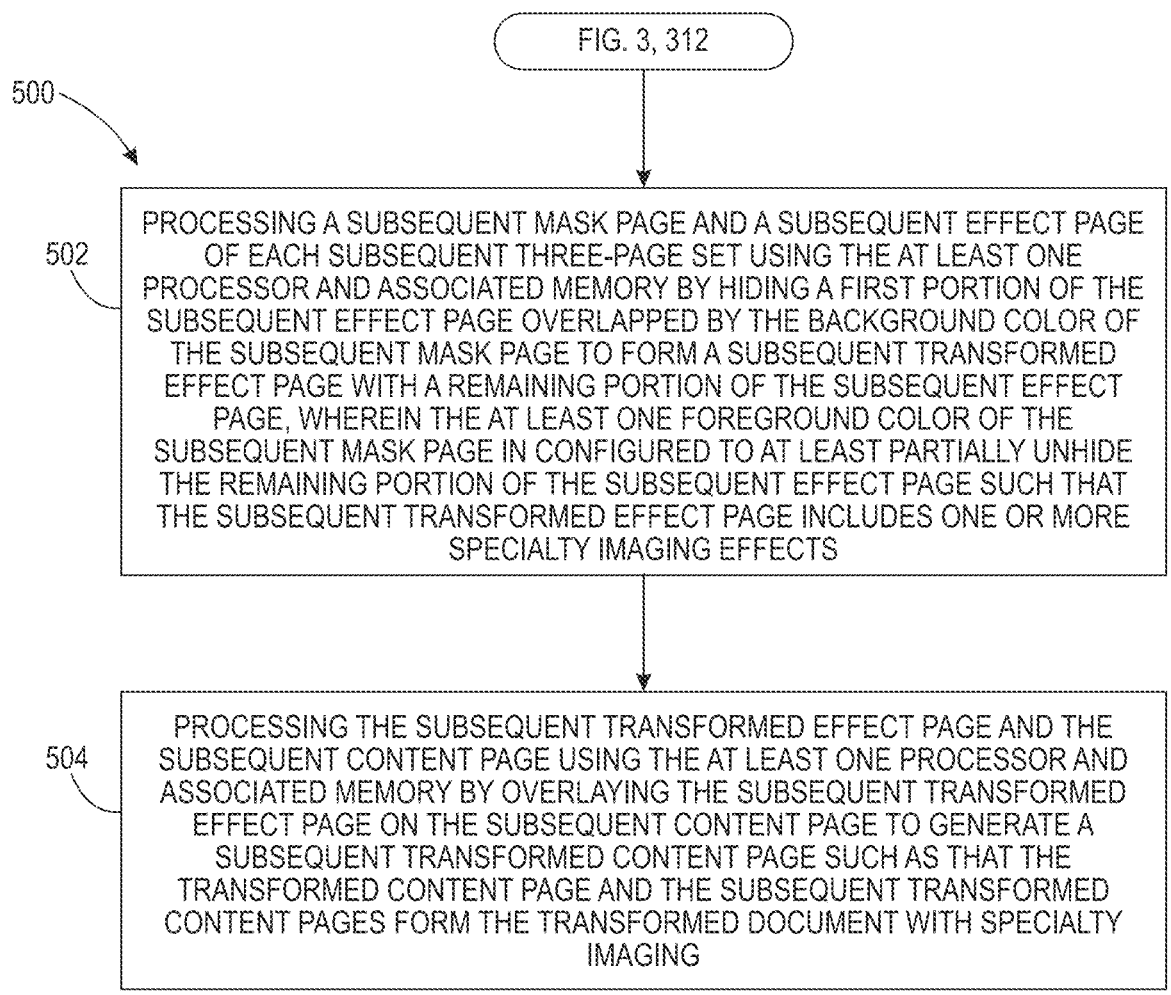
FIG. 5, in combination with FIG. 3, is a flowchart of yet another exemplary embodiment of a process for generating a document with specialty imaging.

With reference to FIGS. 3 and 5, an exemplary embodiment of yet another process 500 for generating a document with specialty imaging includes the process 300 of FIG. 3. In this embodiment, the document includes multiple three-page sets of content, mask, and effect pages with at least one of the content page, mask page, and effect page being different in subsequent three-page sets. The process 500 continues from 312 to 502 where a subsequent mask page and a subsequent effect page of each subsequent three-page set are processed using the at least one processor and associated memory by hiding a first portion of the subsequent effect page overlapped by the background color of the subsequent mask page to form a subsequent transformed effect page with a remaining portion of the subsequent effect page. The at least one foreground color of the subsequent mask page is configured to at least partially unhide the remaining portion of the subsequent effect page. In this embodiment, the subsequent transformed effect page includes one or more specialty imaging effects. Next, the subsequent transformed effect page and the subsequent content page of each subsequent three-page set are processed using the at least one processor and associated memory by overlaying the subsequent transformed effect page on the subsequent content page to generate a subsequent transformed content page (504). The transformed content page and the subsequent transformed content pages form the transformed document with specialty imaging.

With reference again to FIG. 3, in another embodiment of the process 300, the background color of the mask page is white. In yet another embodiment of the process 300, the at least one foreground color of the mask page includes a first foreground color and a second foreground color. In a further embodiment of the process 300, the first foreground color of the mask page is black and unhides the remaining portion of the effects page associated with the black foreground color. In another further embodiment of the process 300, the second foreground color of the mask page is a select shade of gray and partially unhides the remaining portion of the effects page associated with the gray foreground color. In this embodiment, the select shade of gray determines a percentage of the remaining portions that is unhidden. For example, a darker (e.g., 90%) shade of gray unhides more than a lighter (e.g., 10%) shade.

Figure 6:
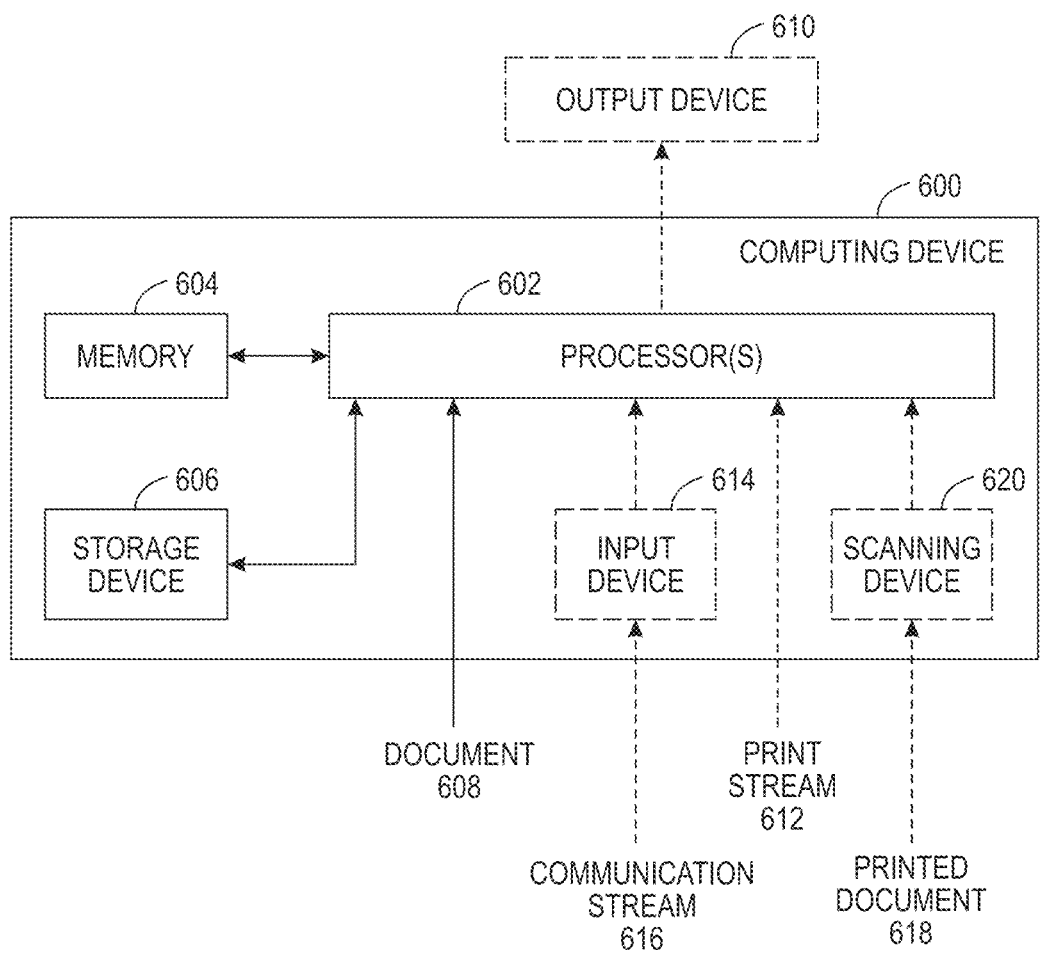
FIG. 6 is a block diagram of an exemplary embodiment of a computing device for generating a document with specialty imaging.

With reference to FIG. 6, an exemplary embodiment of a computing device 600 for generating a document with specialty imaging includes at least one processor 602, memory 604, and a storage device 606. The memory 604 is associated with the at least one processor 602. The storage device 604 is in operative communication with the at least one processor 602. The at least one processor 602 is configured to receive a document 608 that includes at least three pages. For example, a set of three pages includes: i) a content page, ii) a mask page with a background color and at least one foreground color, and iii) an effect page with at least one special imaging effect. The at least one processor 602 and associated memory 604 are configured to at least temporarily store the content page, mask page, and effect page in the storage device 606.

The at least one processor 602 and associated memory 604 are configured to process the mask page and the effect page by hiding a first portion of the effect page overlapped by the background color of the mask page to form a transformed effect page with a remaining portion of the effect page. The at least one foreground color of the mask page is configured to at least partially unhide the remaining portion of the effect page. In this embodiment, the transformed effect page includes one or more specialty imaging effects. The at least one processor 602 and associated memory 604 are configured to at least temporarily store the transformed effect page in the storage device 606.

The at least one processor 602 and associated memory 604 are configured to process the transformed effect page and the content page by overlaying the transformed effect page on the content page to generate a transformed content page that forms a transformed document with specialty imaging. The at least one processor 602 and associated memory 604 are configured to at least temporarily store the transformed document in the storage device 606.

In another embodiment of the computing device 600, the at least one processor 602 is configured to send the transformed document to an output device 610 accessible to the computing device 600. In a further embodiment, the output device 610 includes a rendering device, a printing device, a display device, a server device, a print server, a document retention device, a cloud device, or any suitable output device in any suitable combination.

In yet another embodiment of the computing device 600, the document 608 is an electronic document generated by an application program. In this embodiment, the at least one processor 602 is configured to receive the electronic document in a print stream 612 from the application program. In still another embodiment of the computing device 600, the document 608 is an electronic document. In this embodiment, the computing device 600 also includes an input device 614 configured to receive the electronic document in a communication stream 616. The at least one processor 602 is configured to receive the electronic document via the input device 614. In still yet another embodiment of the computing device 600, the document 608 is a printed document 618. In this embodiment, the computing device 600 also includes a scanning device 620 configured to receive the printed document 618 and to generate an electronic document based on the printed document 618. The at least one processor 602 is configured to receive the electronic document via the scanning device 620. In another embodiment of the computing device 600, the at least one special imaging effect includes a gloss mark, an infrared mark, a correlation mark, an ultraviolet mark, a microtext mark, a fluorescent mark, or any suitable specialty imaging effect in any suitable combination.

In another embodiment of the computing device 600, the document 608 includes multiple content pages. In this embodiment, the at least one processor 602 and associated memory 604 are configured to process the transformed effect page and each subsequent content page by overlaying the transformed effect page on the corresponding subsequent content page to generate a corresponding subsequent transformed content page. The transformed content page and the subsequent transformed content pages form the transformed document with specialty imaging.

In yet another embodiment of the computing device 600, the document 608 includes multiple three-page sets of content, mask, and effect pages with at least one of the content page, mask page, and effect page being different in subsequent three-page sets. In this embodiment, the at least one processor 602 and associated memory 604 are configured to process a subsequent mask page and a subsequent effect page of each subsequent three-page set by hiding a first portion of the subsequent effect page overlapped by the background color of the subsequent mask page to form a subsequent transformed effect page with a remaining portion of the subsequent effect page. The at least one foreground color of the subsequent mask page is configured to at least partially unhide the remaining portion of the subsequent effect page. The subsequent transformed effect page includes one or more specialty imaging effects. In this embodiment, the at least one processor 602 and associated memory 604 are configured to process the subsequent transformed effect page and the subsequent content page of each subsequent three-page set by overlaying the subsequent transformed effect page on the subsequent content page to generate a subsequent transformed content page. The transformed content page and the subsequent transformed content pages form the transformed document with specialty imaging.

In still another embodiment of the computing device 600, the background color of the mask page is white. In still yet another embodiment of the computing device 600, the at least one foreground color of the mask page includes a first foreground color and a second foreground color. In a further embodiment of the computing device 600, the first foreground color of the mask page is black and unhides the remaining portion of the effects page associated with the black foreground color. In another further embodiment of the computing device 600, the second foreground color of the mask page is a select shade of gray and partially unhides the remaining portion of the effects page associated with the gray foreground color. In this embodiment, the select shade of gray determines a percentage of the remaining portions that is unhidden. For example, a darker (e.g., 90%) shade of gray unhides more than a lighter (e.g., 10%) shade.

With reference to FIGS. 3-6, various exemplary embodiments of non-transitory computer-readable medium storing program instructions that, when executed by at least one processor 602, cause a computing device 600 to perform a method for generating a document with specialty imaging. For example, various embodiments of the computing device 600 are described above with reference to FIG. 6. Various embodiments of the method for generating a document with specialty imaging are described above with reference to FIGS. 3-5. In other words, the program instructions of the various exemplary embodiments of non-transitory computer-readable medium are defined by any suitable combination of the processes 300, 400, 500 described above with reference to FIGS. 3-5. Similarly, the at least one processor 602 and the computing device 600 associated with the various exemplary embodiments of non-transitory computer-readable medium are defined by any suitable combination of the computing device 600 described above with reference to FIG. 6. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other medium from which a computer can read and use.

The exemplary method may be implemented on one or more special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device capable of implementing the various embodiments disclosed in reference to FIGS. 3-5 can be used to implement the computing device of FIG. 6.

It will be appreciated that variants of the above-disclosed exemplary embodiments and other features and functions, or alternatives thereof, may be combined into many other different computer platforms, computing devices, computer applications, or combinations thereof. Various presently unforeseen or unanticipated alternatives, modifications, variations, or improvements therein may be subsequently made by those skilled in the art which are also intended to be encompassed by the following claims.

What is claimed is:

1. A computer-implemented method for generating a document with specialty imaging, comprising:
   receiving a document at a computing device, wherein the computing device includes at least one processor and associated memory and a storage device, wherein the document includes at least three pages, including i) a content page, ii) a mask page with a background color and at least one foreground color, and iii) an effect page with at least one special imaging effect;
   at least temporarily storing the content page, mask page, and effect page in the storage device;
   processing the mask page and the effect page using the at least one processor and associated memory by hiding a first portion of the effect page overlapped by the background color of the mask page to form a transformed effect page with a remaining portion of the effect page, wherein the at least one foreground color of the mask page is configured to at least partially unhide the remaining portion of the effect page such that the transformed effect page includes one or more specialty imaging effects;
   at least temporarily storing the transformed effect page in the storage device;
   processing the transformed effect page and the content page using the at least one processor and associated memory by overlaying the transformed effect page on the content page to generate a transformed content page that forms a transformed document with specialty imaging; and
   at least temporarily storing the transformed document in the storage device.

2. The method of claim 1, further comprising:
   sending the transformed document to an output device.

3. The method of claim 2, wherein the output device includes at least one of a rendering device, a printing device, a display device, a server device, a print server, a document retention device, and a cloud device.

4. The method of claim 1, wherein the document is an electronic document received in a print stream from an application program.

5. The method of claim 1, wherein the document is an electronic document received in a communication stream via an input device.

6. The method of claim 1, wherein the document is a printed document received in a communication stream via a scanning device.

7. The method of claim 1, wherein the at least one special imaging effect includes one or more of a gloss mark, an infrared mark, a correlation mark, an ultraviolet mark, a microtext mark, and a fluorescent mark.

8. The method of claim 1, wherein the document includes multiple content pages, the method further comprising:
   processing the transformed effect page and each subsequent content page using the at least one processor and associated memory by overlaying the transformed effect page on the corresponding subsequent content page to generate a corresponding subsequent transformed content page such that the transformed content page and the subsequent transformed content pages form the transformed document with specialty imaging.

9. The method of claim 1, wherein the document includes multiple three-page sets of content, mask, and effect pages with at least one of the content page, mask page, and effect page being different in subsequent three-page sets, the method further comprising:
   processing a subsequent mask page and a subsequent effect page of each subsequent three-page set using the at least one processor and associated memory by hiding a first portion of the subsequent effect page overlapped by the background color of the subsequent mask page to form a subsequent transformed effect page with a remaining portion of the subsequent effect page, wherein the at least one foreground color of the subsequent mask page is configured to at least partially unhide the remaining portion of the subsequent effect page such that the subsequent transformed effect page includes one or more specialty imaging effects; and
   processing the subsequent transformed effect page and the subsequent content page of each subsequent three-page set using the at least one processor and associated memory by overlaying the subsequent transformed effect page on the subsequent content page to generate a subsequent transformed content page such that the transformed content page and the subsequent transformed content pages form the transformed document with specialty imaging.

10. The method of claim 1, wherein the background color of the mask page is white.

11. The method of claim 1, wherein the at least one foreground color of the mask page includes a first foreground color and a second foreground color.

12. The method of claim 11, wherein the first foreground color of the mask page is black and unhides the remaining portion of the effects page associated with the black foreground color.

13. The method of claim 11, wherein the second foreground color of the mask page is a select shade of gray and partially unhides the remaining portion of the effects page associated with the gray foreground color, where the select shade of gray determines a percentage of the remaining portions that is unhidden.

14. A computing device for generating a document with specialty imaging, comprising:
   at least one processor and associated memory; and
   a storage device in operative communication with the at least one processor;
   wherein the at least one processor is configured to receive a document that includes at least three pages, including i) a content page, ii) a mask page with a background color and at least one foreground color, and iii) an effect page with at least one special imaging effect;
   wherein the at least one processor and associated memory are configured to at least temporarily store the content page, mask page, and effect page in the storage device;
   wherein the at least one processor and associated memory are configured to process the mask page and the effect page by hiding a first portion of the effect page overlapped by the background color of the mask page to form a transformed effect page with a remaining portion of the effect page, wherein the at least one foreground color of the mask page is configured to at least partially unhide the remaining portion of the effect page such that the transformed effect page includes one or more specialty imaging effects;

wherein the at least one processor and associated memory are configured to at least temporarily store the transformed effect page in the storage device;

wherein the at least one processor and associated memory are configured to process the transformed effect page and the content page by overlaying the transformed effect page on the content page to generate a transformed content page that forms a transformed document with specialty imaging;

wherein the at least one processor and associated memory are configured to at least temporarily store the transformed document in the storage device.

15. The computing device of claim 14, wherein the at least one processor is configured to send the transformed document to an output device accessible to the computing device.

16. The computing device of claim 15, wherein the output device includes at least one of a rendering device, a printing device, a display device, a server device, a print server, a document retention device, and a cloud device.

17. The computing device of claim 14, wherein the document is an electronic document generated by an application program, wherein the at least one processor is configured to receive the electronic document in a print stream from the application program.

18. The computing device of claim 14, wherein the document is an electronic document, the computing device further comprising:
   an input device configured to receive the electronic document in a communication stream, wherein the at least one processor is configured to receive the electronic document via the input device.

19. The computing device of claim 14, wherein the document is a printed document, the computing device further comprising:

a scanning device configured to receive the printed document and to generate an electronic document based on the printed document, wherein the at least one processor is configured to receive the electronic document via the scanning device.

20. A non-transitory computer-readable medium storing program instructions that, when executed by at least one processor, cause a computing device to perform a method for generating a document with specialty imaging, the method comprising:
   receiving a document at the computing device, wherein the document includes at least three pages, including i) a content page, ii) a mask page with a background color and at least one foreground color, and iii) an effect page with at least one special imaging effect;
   at least temporarily storing the content page, mask page, and effect page in a storage device accessible to the computing device;
   processing the mask page and the effect page by hiding a first portion of the effect page overlapped by the background color of the mask page to form a transformed effect page with a remaining portion of the effect page, wherein the at least one foreground color of the mask page is configured to at least partially unhide the remaining portion of the effect page such that the transformed effect page includes one or more specialty imaging effects;
   at least temporarily storing the transformed effect page in the storage device;
   processing the transformed effect page and the content page by overlaying the transformed effect page on the content page to generate a transformed content page that forms a transformed document with specialty imaging; and
   at least temporarily storing the transformed document in the storage device.

* * * * *